April 11, 1961   C. S. WILCOX ET AL   2,979,653
REGULATED TRANSISTOR POWER SUPPLY
Filed Dec. 16, 1957
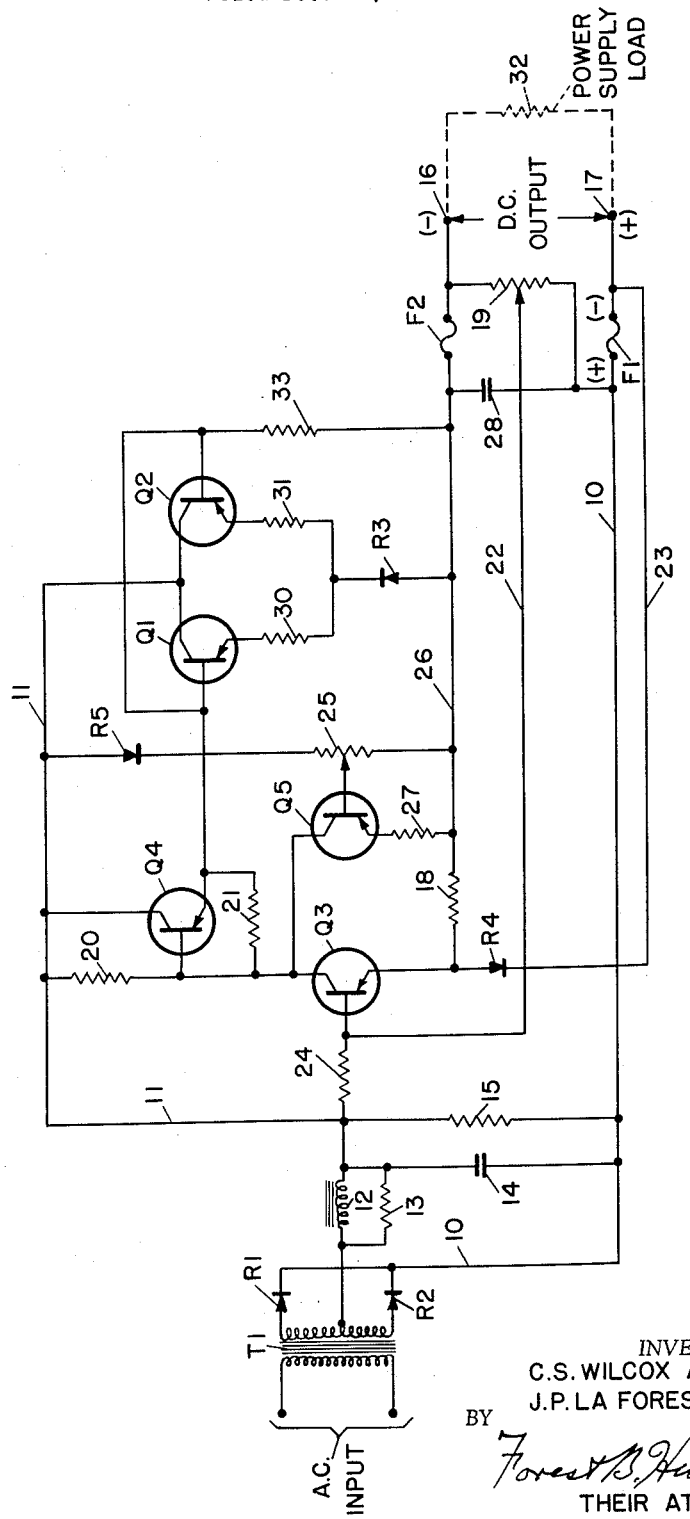
INVENTORS
C.S. WILCOX AND
J.P. LA FOREST
BY
Forest B. Hitchcock
THEIR ATTORNEY

United States Patent Office 2,979,653
Patented Apr. 11, 1961

2,979,653

REGULATED TRANSISTOR POWER SUPPLY

Clinton S. Wilcox, Rochester, and John P. La Forest, Macedon, N.Y., assignors to General Railway Signal Company, Rochester, N.Y.

Filed Dec. 16, 1957, Ser. No. 702,871

1 Claim. (Cl. 323—22)

This invention relates to electronic power supplies and more particularly pertains to a voltage regulated transistor power supply.

It is well-known that the voltage provided by a power supply is dependent upon the load current drawn, with the voltage generally decreasing as the current increases. To overcome this, various systems have been devised which sense variations in the output voltage and make compensations therefor in such a manner that the output voltage tends to stay at a substantially constant value. With the advent of transistors, various means have been devised to provide transistorized voltage supplies also incorporating voltage regulating means. Such a voltage supply is designed to provide some predetermined maximum of current to an external load, and in the event that this rated load is considerably exceeded, damage to the transistors may result. Although protective fuses may be provided in the output circuit, the time required for them to respond and open the load circuit is sufficiently long that damage to the transistors may result.

In accordance with these various considerations, it is an object of this invention to provide a regulated transistor voltage supply having an electronic overload protection means incorporated therein. This overload protection means acts instantly in response to a severe overload to reduce the output voltage to substantially zero so that the possibility of damage to the power supply is removed.

It is an additional object of this invention to provide a transistor regulated power supply having an improved regulating circuit organization which is highly effective in maintaining the output voltage constant despite variations in the input voltage and in the power supply load.

Other objects, purposes, and characteristic features of the present invention will in part be obvious and in part will become clear as the description of the invention progresses.

In describing this invention in detail, reference will be made to the accompanying drawing which illustrates a circuit diagram of the power supply of this invention.

To simplify the illustration and facilitate in the explanation of this invention, the various parts and circuits have been shown diagrammatically, and certain conventional illustrations have been employed to make it easier to understand the principles of this invention rather than to illustrate the specific construction and arrangement of parts that might be used in practice. The various transistors shown are assumed to be of the germanium P-N-P junction type. Other types of transistors can also be used, provided that the operating bias voltages are suitably altered.

Referring to the drawing, it is shown that the alternating-current input to the power supply, which may be at the usual commercial power frequency such as 60 cycles per second, is applied to the opposite terminals of the primary winding of an input transformer T1. The secondary winding of this transformer has its opposite terminals connected through the two semiconductor rectifiers R1 and R2, respectively, to wire 10. The center-tap of the secondary winding is connected to wire 11 through the parallel combination of choke 12 and resistor 13.

On those positive half-cycles of the alternating input voltage that the upper terminal of the secondary winding is positive with respect to the center-tap, there is a flow of current from such upper terminal, through rectifier R1 to wire 10, and through fuse F1 to the (+) output terminal 17. When a load is connected to the output terminals, the load current passes through the load from the (+) terminal 17 to the (−) terminal 16 and then through fuse F2, rectifier R3, resistors 30 and 31 in parallel, through the respective parallel emitter-collector circuits of the transistors Q1 and Q2, to wire 11, through choke 12 and resistor 13 in parallel, back to the center-tap of the secondary winding. On the opposite half-cycles of the input voltage, the flow of current is the same with the exception that it then flows through rectifier R2 rather than rectifier R1. At such times, when the lower terminal of the secondary winding is positive with respect to the center-tap, the upper terminal is negative with respect to the center-tap so that rectifier R1 cannot conduct.

The choke 12 and capacitor 14 provide a conventional filtering circuit which tends to suppress alternating-current components in the rectified output current. The resistor 13 shunting choke 12 is provided to reduce voltage peaks which ordinarily occur when the power supply is switched on or off. Such voltage peaks may be of sufficient amplitude that they momentarily exceed the peak inverse voltage rating of the rectifier. The resistor 15 is effectively a bleeder resistor connected in parallel with the filtering capacitor 14. Its function is to prevent the filter capacitor 14 from charging to the peak output voltage of the rectifier circuit under no-load conditions.

As previously described, the current supplied to an externally connected load (respresented diagrammatically by resistor 32) passes through the emitter-collector circuits of the two parallel transistors Q1 and Q2. As will subsequently be made clear, regulation of the output voltage is effected through variation of the internal resistance of these two regulating transistors. Thus, upon any tendency of the output voltage to rise, the regulating circuit organization senses such voltage rise and immediately produces an increase in the effective internal resistance of the transistors Q1 and Q2. As a result, a somewhat greater portion of the rectifier output voltage appearing between wires 10 and 11 then appears across the emitter-collector circuits of the transistors Q1 and Q2. This necessarily produces a corresponding drop in the voltage available at the output terminals 16 and 17 to which the external load, represented by resistor 32, is connected. The voltage is thus instantly restored to substantially its original value. Upon a decrease in the output voltage at terminals 16 and 17, a similar corrective action in the opposite direction occurs causing the voltage to rise at the output terminals.

Variations in the output voltage at terminals 16 and 17 are sensed by the transistor Q3. This transistor has its emitter connected to the junction of silicon rectifier R4 and resistor 18. These latter two circuit elements are included, along with the fuse F2, in a series voltage divider connected between terminal 16 and terminal 17. In this voltage dividing circuit, the resistance provided by the fuse F2 and its associated fuseholder is insignificant as compared to the resistance of the resistor 18. As will subsequently be described, however, the resistance of the fuse and fuseholder can at times not be ignored; such resistance, is in fact, utilized in a novel circuit organization to be described presently.

The rectifier R4 is of the type commonly known as a Zener type; as such it has the property that the voltage across it will vary in an approximately linear manner only if such voltage remains below a predetermined breakdown value. For higher voltages, the effective back resistance of the rectifier varies in such a manner that the voltage across it tends to be maintained substantially constant.

In the emitter biasing circuit for transistor Q3, the resistance of resistor 18 is so chosen with respect to the characteristics of Zener rectifier R4 that the voltage across the rectifier would ordinarily tend to be above its breakdown value; however, because of its Zener type characteristics, the voltage across the rectifier does not exceed its predetermined breakdown voltage. The result is that, despite variations in the output voltage, the voltage on the emitter of transistor Q3 always tends to be maintained at a fixed voltage level with respect to the positive output terminal 17. As the voltage between terminals 16 and 17 varies, the voltage across resistor 18 and fuse F2 varies accordingly, but the voltage across rectifier R4 and thus between the emitter and terminal 17 remains essentially constant.

The base of transistor Q3 is, on the other hand, permitted to vary in accordance with the level of the output voltage. To accomplish this, the base is connected to a variable tap on the potentiometer 19. This potentiometer has its upper terminal connected to the negative output terminal 16, and its lower terminal is connected through fuse F1 to the positive output terminal 17.

Under no load conditions, there can be no voltage drop across fuse F1 as the result of a flow of load current through the fuse. Consequently, the voltage across the fuse resistance of potentiometer 19 is dependent only on the output voltage between terminals 16 and 17. The base voltage of transistor Q3 is determined by the setting of the tap on potentiometer 19, and this base voltage is selected to give a bias voltage between emitter and base of transistor Q3 that will permit the conduction of a suitable level of collector-emitter current by this transistor.

The amplitude of the collector-emitter current of transistor Q3 determines the voltage drop across resistor 20 located in the collector-emitter circuit of transistor Q4. The more current that flows through resistor 20, the greater the potential difference between the collector and base and thus the less difference in potential between the base and emitter of this transistor. A reduction in voltage of the base bringing it closer to the emitter results in a reduction of collector current of this transistor. Since the emitter of transistor Q4 is connected directly to the bases of the transistors Q1 and Q2, a reduction in collector-current of transistor Q4 brings about a corresponding reduction in the emitter-base currents of the two transistors Q1 and Q2. This has the effect of reducing the collector currents of these two transistors, thereby increasing the internal resistance of these transistors and bringing about a reduction in output voltage.

The connection of the base of transistor Q4 to the junction of voltage dividing resistors 20 and 21 provides temperature compensation for transistor Q4. In a manner well-known in the art, this temperature compensation means overcomes the effects of the relatively high collector leakage currents which occur under conditions of high temperature operation.

The collector current of a transistor is a function of its temperature, increasing by a known amount as the temperature increases. Since regulation of the output voltage is obtained by varying the collector current of transistors Q1 and Q2, it must follow that variations in the collector current resulting from elevated temperature must produce undesirable effects with respect to regulation of the output voltage. When the collectors of transistors Q1 and Q2 are supplying a substantial amount of current to an external load, the relatively small current increment produced by high temperature can usually be ignored. However, under no-load or light-load conditions, the leakage current cannot be ignored.

Compensation for this condition is obtained primarily by means of the rectifier R3 connected in the emitter circuits of transistors Q1 and Q2. This rectifier R3 is preferably a silicon rectifier. As such, it is a non-linear resistance with respect to current in the forward direction. Thus, even for very low levels of current through rectifier R3, there is a predetermined voltage drop across the rectifier, and this voltage increases only slightly as the forward current through rectifier R3 increases over a fairly substantial range. The polarity of this voltage is such as to provide through resistor 33 a small negative bias voltage on the emitters of transistors Q1 and Q2 with respect to the common bases of these transistors. Even for the very small emitter currents occurring under no load condition (passing through potentiometer 19), the leakage currents under elevated temperature conditions produce sufficient voltage drop across rectifier R3 to bias the emitters of transistors Q1 and Q2 to near cut-off. However, because of the non-linear characteristics of rectifier R3, the voltage across this rectifier cannot increase in proportion to the emitter currents so that under high load current conditions, there is not an excessive bias voltage present at the emitters of these two transistors.

The operation of the regulating means of the present invention will be described from the viewpoint of what occurs when there is a variation in the output voltage. Thus, it will be assumed that the output voltage at terminals 16 and 17 has decreased slightly. It will be additionally assumed at first that this voltage decrease is brought about by some condition other than an increase of load current as it will then be possible to omit considerations of the effect of the voltage drop across the resistance of fuse F1. It may thus be assumed, for example, that the voltage drop at the output terminals results from a decrease in the alternating-current input voltage.

A decrease in voltage between terminals 16 and 17 decreases the potential difference between the movable tap on potentiometer 19 and wire 10. With substantially no voltage drop across the resistance of fuse F1, this means that the voltage between wire 22 and wire 23 is correspondingly reduced. As a result, there is a decrease in the emitter-base voltage of transistor Q3 since the emitter of this transistor tends to be maintained at the fixed voltage level above that on wire 23 as determined by the characteristics of the Zener type rectifier R4. If there is, in addition, a decrease in voltage on wire 11 as might be caused by a reduction of the alternating input voltage, this further reduces the base voltage of transistor Q3 since this base is connected to wire 11 through resistor 24.

The reduction of emitter-base voltage of transistor Q3 causes a reduction in the collector current passing through resistor 20. This raises the potential of the base of transistor Q4 with respect to its emitter so that the collector current of transistor Q4 is increased. The resulting increase of emitter-base current of transistors Q1 and Q2 brings about a reduction in the internal resistance of the transistors Q1 and Q2 so that their collector currents are increased, and the output voltage available between terminals 16 and 17 is restored to approximately its original value.

When there is an increase in the output voltage at terminals 16 and 17, the opposite actions occur. Thus, the emitter-base voltage of transistor Q3 is increased so that the collector current of this transistor also increases. The flow of this collector current through resistor 20 reduces the emitter-base potential of transistor Q4 so that its collector current is decreased. This decreases the emitter-base currents of transistors Q1 and Q2, thereby increasing their internal resistance and bringing about a decrease in the output voltage.

Under conditions of load, the voltage drop produced by the load current passing through the resistance of fuse F1 and its associated fuseholder must be taken into account. As indicated on the drawing, the polarity of the voltage across the fuse is such as to make the left-hand terminal positive with respect to the right-hand terminal.

The voltage divider provided for biasing the emitter of transistor Q3 has its lower terminal, i.e. the bottom terminal of Zener rectifier R4, connected to the positive output terminal 17. Thus, the emitter voltage of transistor Q3 is at a fixed level with respect to the output terminal 17, and this voltage is not affected by the voltage drop across fuse F1. However, the voltage on wire 22 and thus also on the base of transistor Q3 is a function not only of the voltage between terminals 16 and 17 but is also governed by the voltage drop across fuse F1 which is, in turn, dependent on the load current. The polarity of the voltage drop across the fuse is such that it tends to reduce the voltage on the wire 22, thereby bringing the base potential of transistor Q3 closer to the emitter and thereby increasing the regulatory effect. The voltage drop across the fuse is, of course, quite small, being of the order of perhaps one-half volt for the maximum load current drawn. However, this voltage does introduce an additional affect upon the base voltage of transistor Q3 that is in addition to the regulation effected on this element through variations in output voltage since it is a variation that is dependent upon the load current. As a result, the power supply is better able to compensate for variations in output voltage occurring with fluctuations of the load.

Protection against overloading the power supply is provided in part by fuses F1 and F2. When the rated current of the fuses is exceeded, either or both will produce an open circuit. A fairly appreciable time is required, however, for a fuse to blow, and if the load current is excessive, as when there is a direct short circuit of the power supply output, then the conduction of the transistors Q1 and Q2 would so far exceed their ratings that they would be damaged even though such excessive current might persist only for a few milliseconds until a fuse had blown. Accordingly, electronic overload protection means is incorporated which causes the output transistors Q1 and Q2 to be cut off immediately in the event of such excessive overload. For overloads only slightly in excess of the rated current, damage to the transistors Q1 and Q2 will ordinarily not occur in the interval required for either fuse F1 or fuse F2 to blow. For this reason, the overload protection circuit is made ineffective for slight overload conditions.

The electronic overload protection circuit includes transistor Q5. The base of this transistor is connected to the tap on potentiometer 25 which is connected in series with the Zener type rectifier R5 between wires 11 and 26. The connection of the emitter to the base through resistor 27 provides the customary temperature compensation. The collector of transistor Q5 is connected directly to the collector of transistor Q3.

For ordinary values of load current, there is only a relatively small voltage drop across the transistors Q1 and Q2. Of this voltage, a fairly substantial portion appears across the back resistance of rectifier R5 so that the base of transistor Q5 is at a relatively low voltage with respect to the emitter. As a result, this transistor is substantially cut off.

The voltage appearing normally across rectifier R5 is less than its breakdown value. However, if the rated current of the power supply is greatly exceeded, a relatively large voltage develops instantly between wires 11 and 26. This voltage considerably exceeds the breakdown voltage of rectifier R5 so that the voltage across the back resistance of the rectifier does not by any means increase in proportion to the increase in voltage between wires 11 and 26. Instead, substantially all of the voltage increase appears across potentiometer 25 with the result that the base of transistor Q5 is considerably increased in potential with respect to the emitter. This produces a substantial collector current which passes through resistor 20 in the collector-base circuit of transistor Q4. As previously described, an increase of current through this resistor 20 decreases its collector current, thereby tending to drive the transistors Q1 and Q2 to the cut-off condition. In this condition, these transistors cannot be damaged by the overload condition.

Capacitor 28 is connected between wires 10 and 26. Its function is to reduce the amplifier gain to a low level for the higher frequencies at which phase shift would be significant. This has the effect of preventing oscillations at such high frequencies.

Having described a transistor regulated power supply of an improved nature and having instantaneous overload protection means, we desire it to be understood that various modifications, adaptations, and alterations can be made to the specific form shown to meet the requirements of practice without in any manner departing from the spirit or scope of this invention.

What we claim is:

In an electronic power supply for providing a regulated direct-current voltage to a pair of output terminals, a source of unregulated direct-current voltage, a voltage regulating transistor, circuit means connecting said source to said output terminals through the emitter-collector circuit of said transistor, control circuit means for said voltage regulating transistor responsive to the level of voltage applied to said output terminals for varying the emitter-base current of said voltage regulating transistor to thereby vary its internal resistance and thus control the level of voltage applied to said output terminals, a series circuit comprising a Zener-type rectifier and a potentiometer connected in parallel with the emitter-collector circuit of said voltage regulating transistor, an overload detecting transistor having its emitter connected to one of said terminals and having its emitter-base bias voltage varied in accordance with the voltage across said potentiometer, said control circuit means being also responsive to the collector current of said overload detection transistor, whereby a considerable overload of current drawn from said output terminals causes the emitter-collector voltage of said voltage regulating transistor to increase substantially above the breakdown voltage of said Zener rectifier thereby producing a considerable increase in emitter bias of said overload detecting transistor thus causing said control circuit means to cut off said voltage regulating transistor and reduce the output voltage to substantially zero.

References Cited in the file of this patent

UNITED STATES PATENTS

| | | |
|---|---|---|
| 2,698,416 | Sherr | Dec. 28, 1954 |
| 2,751,549 | Chase | June 19, 1956 |
| 2,832,900 | Ford | Apr. 29, 1958 |
| 2,897,432 | Jackson | July 28, 1959 |
| 2,904,742 | Chase | Sept. 15, 1959 |